(12) United States Patent
Chiou

(10) Patent No.: US 6,867,829 B2  
(45) Date of Patent: Mar. 15, 2005

(54) BACK LIGHT DEVICE AND A LIQUID CRYSTAL DISPLAY APPLYING THEREOF

(75) Inventor: Yi-Shiuan Chiou, Taipei (TW)

(73) Assignee: AU Optronics Corp., Hsinchu (TW)

(*) Notice: Subject to any disclaimer, the term of this patent is extended or adjusted under 35 U.S.C. 154(b) by 99 days.

(21) Appl. No.: 10/370,123

(22) Filed: Feb. 18, 2003

(65) Prior Publication Data

US 2003/0156234 A1 Aug. 21, 2003

(30) Foreign Application Priority Data

Feb. 19, 2002 (TW) .................................. 91102782 A

(51) Int. Cl.$^7$ .................................................. G02F 1/13
(52) U.S. Cl. ........................... 349/66; 349/67; 349/95
(58) Field of Search ............................ 349/95, 66, 67

(56) References Cited

U.S. PATENT DOCUMENTS 4,330,813 A * 5/1982 Deutsch ....................... 362/244
5,278,545 A * 1/1994 Streck .......................... 345/102
6,469,755 B1 * 10/2002 Adachi et al. ................. 349/62

FOREIGN PATENT DOCUMENTS

| JP | 09-005742 | 1/1997 |
|---|---|---|
| JP | 10-133027 | 5/1998 |

* cited by examiner

Primary Examiner—James A. Dudek
(74) Attorney, Agent, or Firm—Ladas & Parry LLP

(57) ABSTRACT

A back light device. This back light device includes a light guide plate and a plurality of lamps, wherein the light guide plate has a first plane and a second plane opposite the first plane. The back light device of this invention has a plurality of arc-shaped recess regions to implement the lamps inside so that light from the lamps can be uniformly emitted by the light guide plate through the arc-shaped recess regions. Thus, a liquid crystal display implemented with the back light device can be uniformly lit.

6 Claims, 3 Drawing Sheets

BACK LIGHT DEVICE AND A LIQUID CRYSTAL DISPLAY APPLYING THEREOF

BACKGROUND OF THE INVENTION

1. Field of the Invention

The invention relates to a back light device for a liquid crystal display (LCD), especially to a uniformly lighting direct type back light device and the LCD applying thereof.

2. Description of the Related Art

FIG. 1A is a perspective view showing a typical direct type back light device of a LCD. In FIG. 1A, the typical direct type back light device 10 includes a light guide plate 11, a reflector 12 and a plurality of a plurality of lamps 13, wherein the lamps 13 are disposed between the reflector 12 and the light guide plate 11.

As shown in FIG. 1A, the typical direct type back light device can distribute light from a light source uniformly over the surface of the liquid crystal panel of an LCD. Generally, the shortest distance between the lamps 13 and the plane of the light guide plate 11 can easily produce the best brightness. Further, the brightness will change with the disposition of the lamps 13 on the plane of the light guide plate 11 adjacent to the liquid crystal panel, to produce a bright and dark line change.

To overcome the bright and dark line change, as shown in FIG. 1B, a cross-sectional view of a typical direct type back light device of an LCD is shown. Masking sheets 24 are formed on the plane of the light guide plate 21 adjacent to the liquid crystal panel with respect to the lamps 23 so that the masking sheets 24 can mask light lines. However, this reduces a number of lights passing through the liquid crystal panel and the brightness of the LCD. FIG. 1C is a cross-sectional view showing another typical direct type back light device of an LCD. Regions on a reflector 32 with respect to the lamps 33 are formed to be V-shaped in order to reflect light from the lamps so that the difference between the bright and dark lines on the light guide plate 31 can be reduced. However, this effect is not completed because the reflective lights other than the V-shaped regions still generate the bright and dark line pattern on the plane of the light guide plate adjacent to the liquid crystal panel.

SUMMARY OF THE INVENTION

Accordingly, the invention provides a back light device, where a plurality of a plurality of lamps are disposed in a plurality of a plurality of arc-shaped recesses. This invention can diffuse light from each lamp uniformly over the plane of the light guide plate adjacent to the liquid crystal panel.

An object of the invention is to provide a back light device including a light guide plate and a plurality of lamps, wherein the light guide plate has a first plane and a second plane opposite the first plane. The light guide plate of this invention further includes a plurality of arc-shaped recesses on the first plane and the lamps are located in the recesses. When the lamps light, light from the lamps is emitted and uniformly distributed by the arc-shaped recesses.

Another object of the invention is to provide a liquid crystal display, which includes a liquid crystal panel, a diffusing means, a light guide plate, a plurality of lamps and a reflector. The light guide plate has a first plane and a second plane opposite the first plane. The light guide plate of this invention further includes a plurality of arc-shaped recesses on the first plane and the lamps are located in the recesses. When the lamps light, the lights of the lamps are emitted and uniformly distributed by the arc-shaped recesses.

An advantage of this invention is in its disposal of a plurality of arc-shaped recesses in the light guide plate to diffuse light from the lamps uniformly over the plane of the light guide plate adjacent to the liquid crystal panel.

BRIEF DESCRIPTION OF THE DRAWINGS

The aforementioned objects, features and advantages of this invention will become apparent by referring to the following detailed description of a preferred embodiment with reference to the accompanying drawings, wherein.

DETAILED DESCRIPTION OF THE INVENTION

Figure 1A:
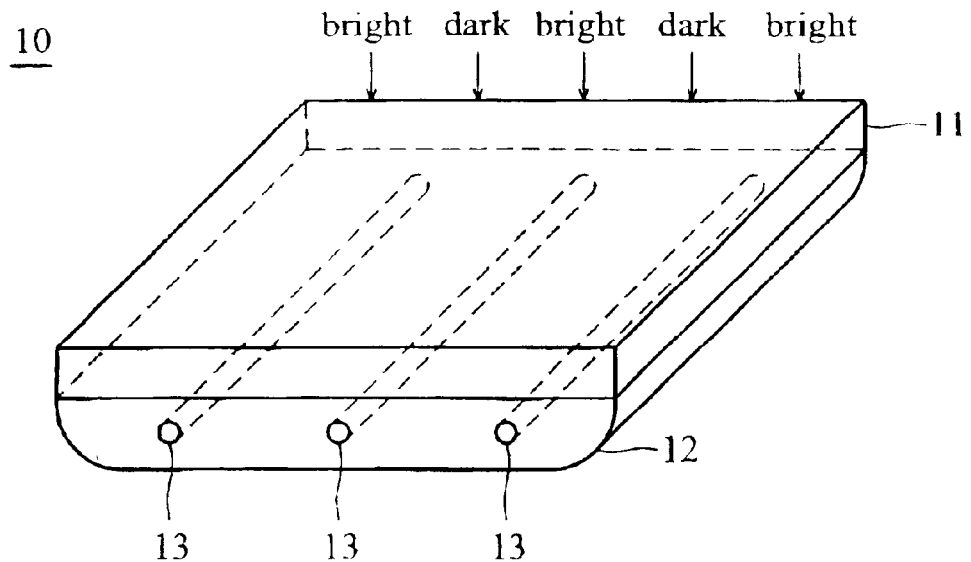
FIG. 1A is a perspective view showing a typical direct type back light device of an LCD.
Figure 1B:
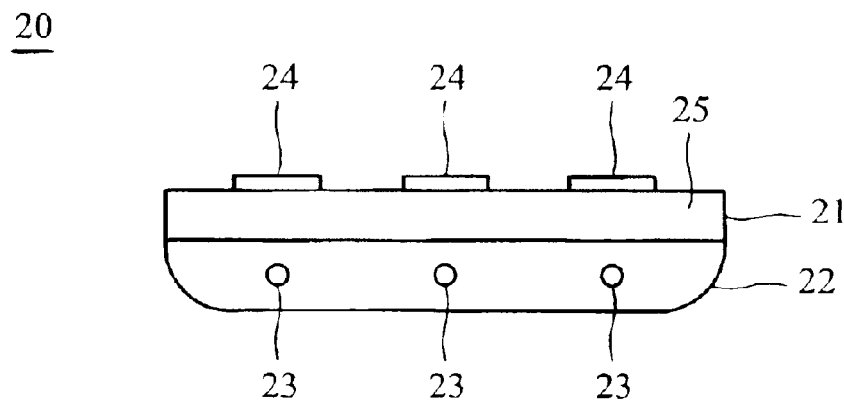
FIG. 1B is a cross-sectional view showing a typical direct type back light device of an LCD.
Figure 1C:
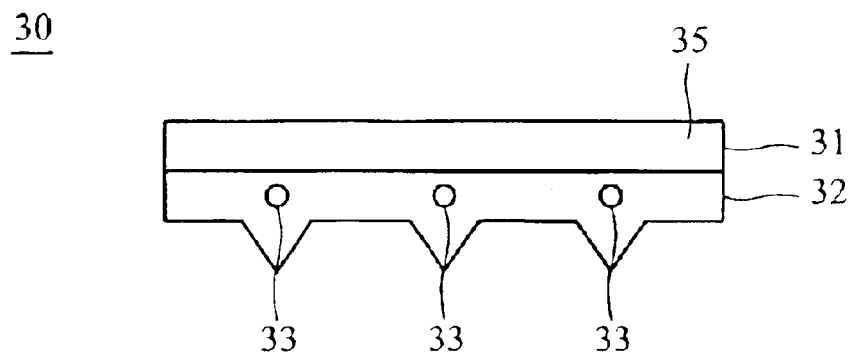
FIG. 1C is a cross-sectional view showing another typical direct type back light device of an LCD.
Figure 2:
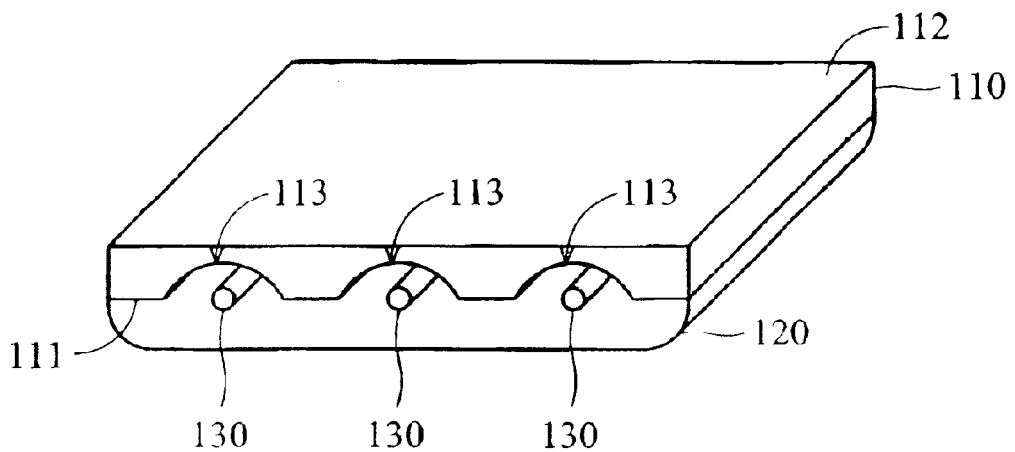
FIG. 2 is a schematically perspective view showing a back light device according to the invention.

FIG. 2 is a schematically perspective view showing a back light device according to the invention. In FIG. 2, the inventive back light device 100 includes a light guide plate 110, a reflector 120 and a plurality of lamps 130. As shown in FIG. 2, the light guide plate 110 has a first plane 111 and a second plane 112 opposite the first plane 111. A plurality of lamps 130 are disposed between the light guide plate 110 and the reflector 120. The reflector 120 is located toward the first plane 111 of the light guide plate 110.

Figure 3:
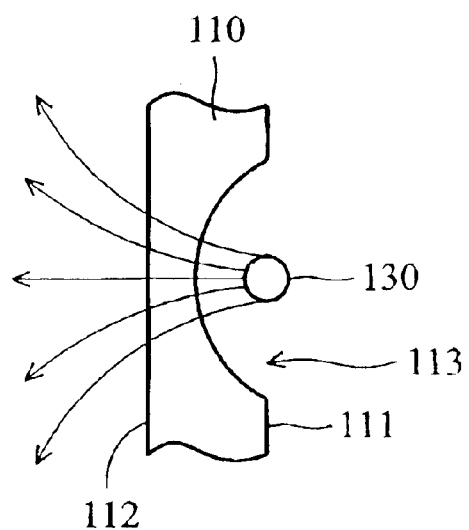
FIG. 3 shows a schematic diagram of a light guide plate with arc-shaped recesses acting as concave lenses according to the invention.

The back light device 100 of this invention implements a plurality of arc-shaped recesses 113 and the recesses 113 are more than the lamps 130 in amount. Each lamp 130 is located between the respective arc-shaped recess 113 and the reflector 120. When the lamps 130 light, light from the lamps 130 directly irradiates the arc-shaped recesses or irradiates the arc-shaped recesses by reflecting light by the reflector 120. As shown in FIG. 3, each lamp 130 to the respective arc-shaped recess 113 can function as a concave lens. According to lens-manufacturing principle, light can produce a diffusive effect through the arc-shaped recess 113 in the light guide plate 110. Thus, light from the lamp 130 can be uniformly emitted by the second plane 112 of the light guide plate 110.

Figure 4:
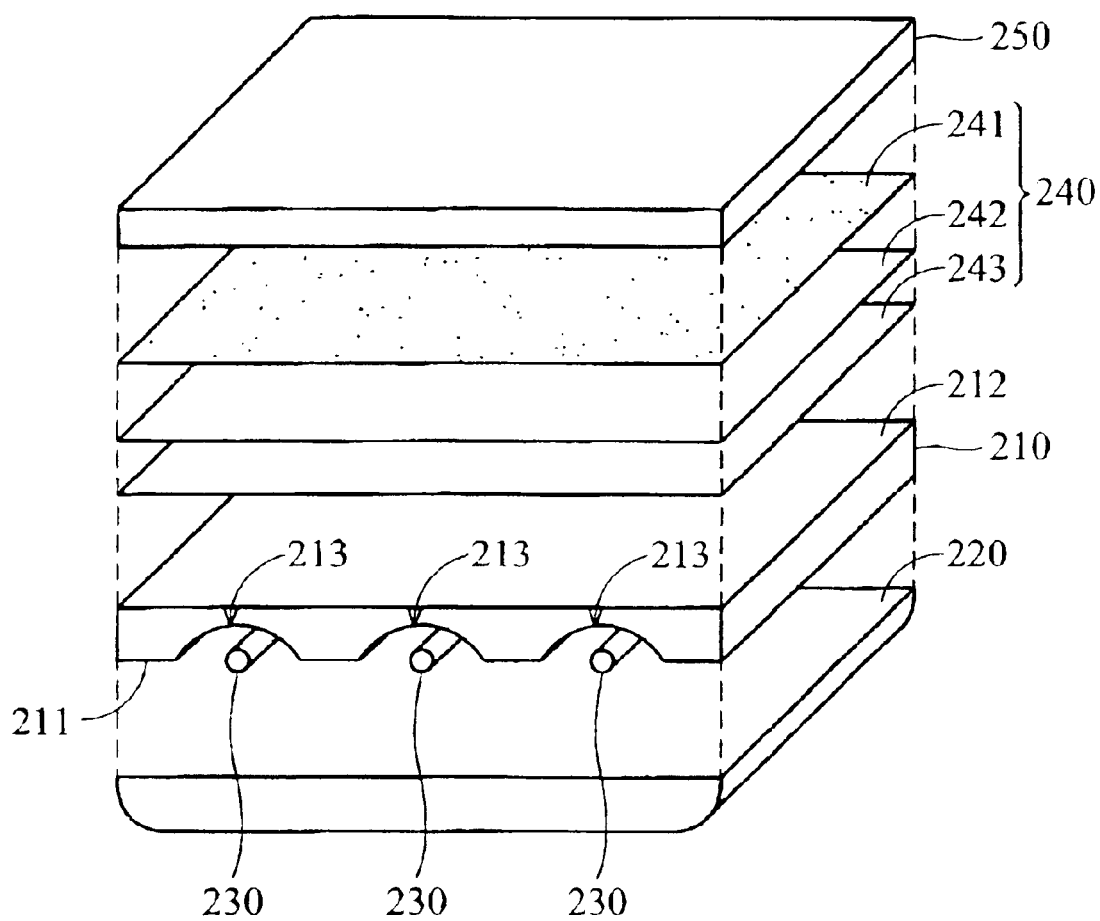
FIG. 4 shows a schematic diagram of an LCD with the back light device according to the invention.

FIG. 4 shows a schematic diagram of an LCD with the back light device according to the invention. In FIG. 4, the LCD 200 includes: a liquid crystal panel 250, a light guide plate 210, a reflector 220 and a plurality of lamps 230. Further, a diffusing means 240 is located between the panel 250 and the plate 210. The light guide plate 210 has a first plane 211 and a second plane 212 opposite the first plane 211. A plurality of lamps 230 are disposed between the plate 210 and the reflector 220. The reflector 220 is located toward the first plane 211.

As shown in FIG. 4, a plurality of arc-shaped recesses 213 are implemented on the first plane 211 of the light guide plate 210 and the recesses 213 are more than the lamps 230 in amount. When the lamps 230 light, lights from the lamps 230 directly irradiate the arc-shaped recesses 213 or irradiate the arc-shaped recesses 213 by reflecting light from the reflector 220. Similarly, as shown in FIG. 3, each lamp 230 to the respective arc-shaped recess 213 can function as concave lens. According to lens-manufacturing principle, light can produce a diffusive effect through the arc-shaped recess 213 (equivalent to 113) in the light guide plate 210 (equivalent to 110). Thus, light from the lamp 230 (equivalent to 130) can be uniformly emitted by the second plane 212 (equivalent to 112) of the light guide plate 210.

Again, as shown in FIG. 4, the light can uniformly emit from the second plane 212 of the plate 210 to the liquid crystal panel 250 through the diffusing means 240. As a result, the light can uniformly irradiate from the liquid crystal panel 250 to the viewer (not shown).

In the present invention, the diffusing means 240 is implemented on the second plane 212 of the plate 210 and includes a diffusing sheet 241, a prism sheet 242 and a protecting film 243. The protecting film 243 is located over the second plane 211 of the plate 210. The diffusing sheet 241 is adjacent to the liquid crystal panel 250, which is on the top. The prism sheet 242 is between the sheet 241 and the film 243. Thus, the desired LCD 200 is formed.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A back light device, comprising:

a light guide plate having a first plane and a second plane opposite the first plane;

a reflector opposite the first plane; and a plurality of lamps, located between the light guide plate and the reflector;

wherein the light guide plate further includes a plurality of arc-shaped recess regions formed on the first plane and each lamp is located between a respective arc-shaped recess region and the reflector so that when the plurality of lamps irradiate, light illumination is uniformly diffused by the light guide plate after irradiation of the plurality of arc-shaped recess regions using direct or indirect irradiation through the reflector's reflection.

2. The back light device of claim 1, wherein the plurality of arc-shaped recess regions include the same number as the plurality of lamps.

3. A liquid crystal display, comprising:

a liquid crystal panel;

a light guide plate, located under the liquid crystal panel, having a first plane and a second plane opposite the first plane;

a reflector opposite the first plane; and a plurality of lamps, located between the light guide plate and the reflector;

wherein the light guide plate further includes a plurality of arc-shaped recess regions formed on the first plane and each lamp is located between a respective arc-shaped recess region and the reflector so that when the plurality of lamps irradiate, light illumination is uniformly diffused by the light guide plate after irradiation of the plurality of arc-shaped recess regions using direct or indirect irradiation through the reflector's reflection, thereby uniformly irradiating on the liquid crystal panel.

4. The liquid crystal display of claim 3, further comprising a diffusing means located between the liquid crystal panel and the light guide plate.

5. The liquid crystal display of claim 4, wherein the diffusing means comprises a protecting film, a prism sheet and a diffusing sheet.

6. The liquid crystal display of claim 3, wherein the plurality of arc-shaped recess regions are more than the plurality of lamps in amount.

* * * * *